Figure 1:
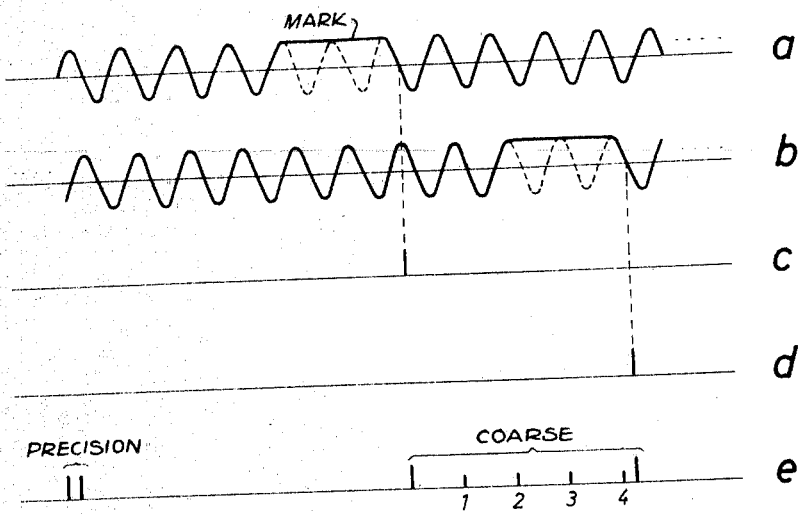

Jan. 10, 1967     M. BÖHM     3,298,024
METHOD AND DEVICE FOR DISTANCE MEASURING WITH
THE AID OF ELECTRIC WAVES
Filed April 29, 1965     3 Sheets-Sheet 1

INVENTOR
MANFRED BÖHM

BY *Perry P. Lanby*
ATTORNEY

INVENTOR
MANFRED BÖHM
BY
ATTORNEY

_United States Patent Office_

3,298,024
Patented Jan. 10, 1967

3,298,024
METHOD AND DEVICE FOR DISTANCE MEASURING WITH THE AID OF ELECTRIC WAVES
Manfred Böhm, Bietigheim, Germany, assignor to International Standard Electric Corporation, New York, N.Y., a corporation of Delaware
Filed Apr. 29, 1965, Ser. No. 451,918
Claims priority, application Germany, June 13, 1964, St 22,255
5 Claims. (Cl. 343—12)

To measure the distance in the air and space traffic the transient time of electro-magnetic oscillations is used which can be pulse or continuous wave transmission. For example, a suitable carrier oscillation is provided with defined markings. The marked carrier oscillation is emitted, received by the object the distance of which is to be measured, and re-transmitted by reply sender, after having been converted to another carrier with an exactly known time delay. The time which elapses between measuring and reception of a defined marking, considering the known delay in the reply sender, represents the measurement for the distance. The marking which is impressed onto the carrier with a suitable modulation type, was in the methods hitherto known in most cases in the form of pulses. In order to obtain a high exactitude in measuring, the edges of the pulses must be steep. This, however, requires large bandwidths. Some more modern proposals deviate from the pulsing method. In such systems the carrier is sine-shaped modulated with a measuring frequency. The distance measuring is thereby reduced to a phase measuring. Such a phase measuring can be made with an exactitude of ±1%. If a defined distance measuring exactness, e.g. to 100 m. exactly is prescribed the defined maximum distance measuring range results therefrom, viz. 100×100= 10000 m.

At larger distances this method is not distinct enough and it may become necessary to use several measuring frequencies. Besides the drawback of a relatively high expenditure in equipment and bandwidths, the difficulty occurs to arrange the different values in the correct manner, i.e. specifically to each other.

The object of the invention is to find a method to measure the distance which possesses, besides a high measuring exactness, also a large range and which avoids the drawbacks of the arrangements known to the art. This is achieved according to the invention in that a sine-oscillation is emitted as modulation of a high frequency carrier, into which markings are gated at defined distances, and that between emitted and received oscillations a phase comparison is made, representing a precision measuring, and that, when emitting a marking, a counter is connected, actuated by a control oscillator, and that this counter is stopped again when the marking has been received, representing a coarse measuring, and that the sum of coarse and precision measuring represents the total measuring value.

If the measuring voltages are heavily interfered with, e.g. by noise, it may occur that at distances which are in the vicinity of the transition from one coarse range into the other, the wrong coarse measuring range is fixed, thus indicating a wrong value. The precision measuring is less sensitive against interferences, because the precision measuring means are, on the average, e.g. a hundred-times, higher than the repeating rate of the markings. Phase fluctuations are thereby matched.

In order to avoid such an error according to a further embodiment of the invention a coarse value, located within the range of the transition from one coarse range to the next one, is compared with the corresponding precision value and corrected, if so required.

Figure 2:
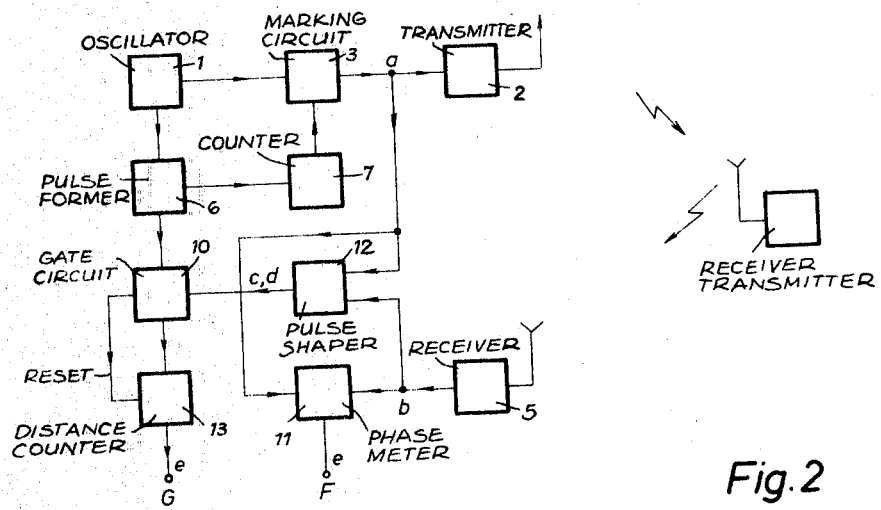
Figure 3:
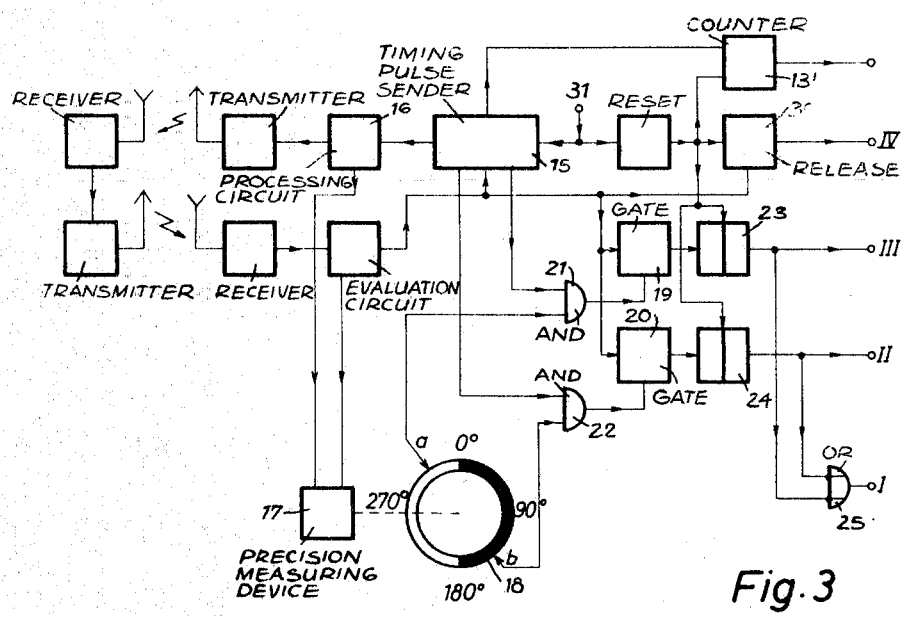
Figure 4:
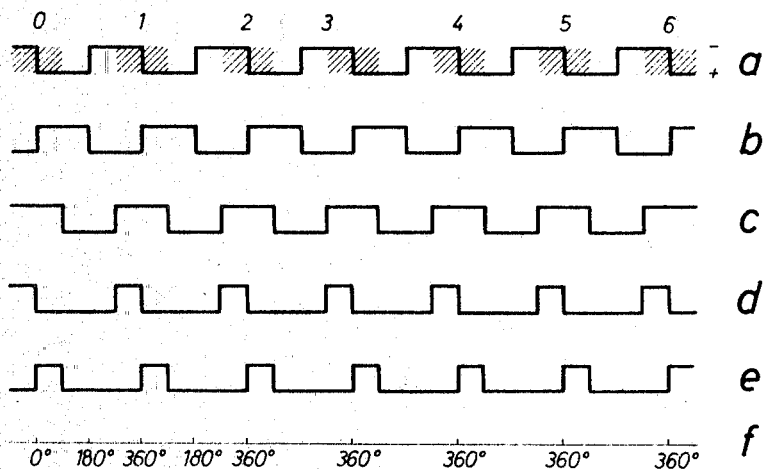
Figure 5:
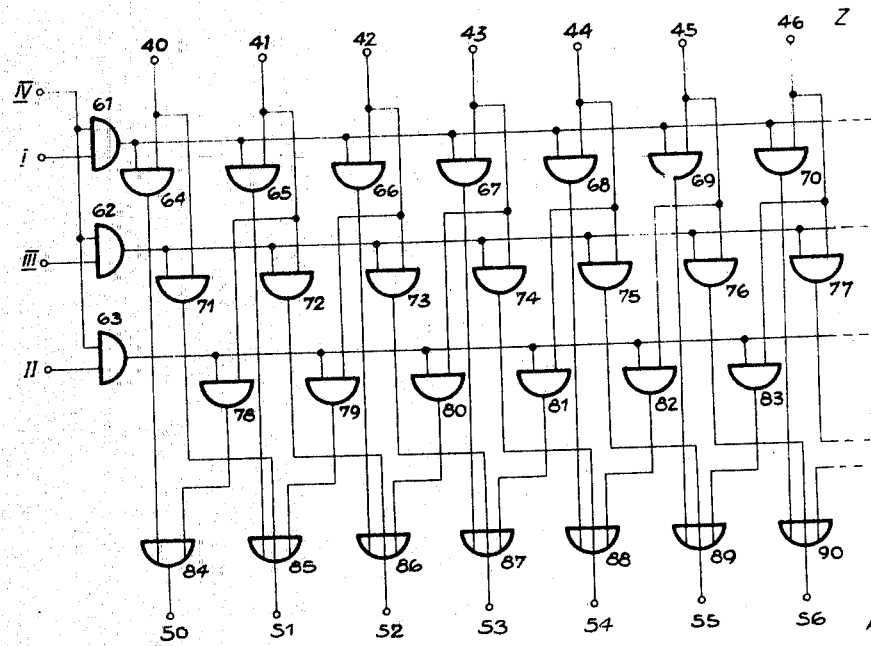
Figure 6:
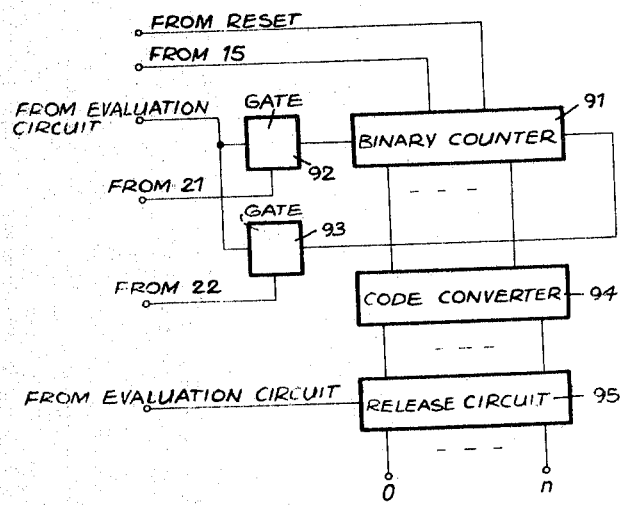

The invention is now explained in detail with reference to examples shown on the accompanying drawings, wherein:

FIG. 1 shows a pulse diagram of the combined distance measuring;
FIG. 2 shows a functional block diagram of an arrangement for combined distance measuring;
FIG. 3 shows a circuit diagram of an arrangement for combined distance measuring with correction of the coarse values;
FIG. 4 shows a pulse diagram for the facility according to FIG. 3;
FIG. 5 shows a functional block diagram of a logical circuit to correct the position of the counter; and
FIG. 6 shows a block diagram of another facility to correct the position of the counter.

FIG. 1, a shows the sine-shaped measuring frequency, generated by a crystal oscillator of conventional constancy, the magnitude of said frequency depending on the measuring exactness required. Into this sine-oscillation markings are gated by suppressing some wave trains at defined distances which are, for example, determined by a counter and have 100 or 1000 wave trains. These markings are made without a phase jump of the measuring frequency. Thus interference with the analog precision measuring is avoided. In principle also any arbitrary timing circuit could be used. Although there occur phase-jumps they do not perceivably impair the analog phase measuring on the average, when the number of oscillations between two succeeding markings is sufficiently high.

When the trailing edge of a marking respectively reaches its zero passage a pulse is generated, as shown in FIG. 1, c. With this pulse a distance counter is started.

The marked oscillation is emitted and received by a responding sender, the distance of which shall be determined and sent back again. The received oscillation b, FIG. 1, is compared with the emitted one in a phase-bridge. The inserted markings do thereby not falsify the result, due to their large distance from each other. The result is the precision value, shown in FIG. 1, e with, for example, 90°. The markings of the received oscillations are also evaluated like the emitted ones. The obtained impulse, FIG. 1, d, stops the counter, the counting result, (cf. FIG. 1, e) in which the coarse value 4 corresponds to the coarse value of the distance. The sum of coarse and precision value represents the total value. This measuring is continuously repeated.

One arrangement for a system to carry out this method is shown in FIG. 2 as a functional block diagram. The lower case letters shown in said functional block diagram refer to the corresponding pulse diagrams shown in FIG. 1. An oscillation of the desired frequency is generated in the oscillator 1 and led to transmitter 2 via the marking circuit 3. From said transmitter 1 the oscillation with the marking is transmitted to a receiver transmitter 4 and immediately sent back after the required frequency conversion, and then received by the receiver 5. The oscillation is moreover led to a pulse former 6 and the pulses actuate a counter 7 which initiates that after, for example, 100 oscillations in the marking circuit 3, the respective marking is inserted. The shaped pulses are moreover applied to a gate circuit 10. The emitted signal is led to a phase meter 11 and to a pulse shaper 12. This pulse shaper forms pulses in compliance with the markings. At an emitted marking the gate circuit 10 is opened by the pulse shaper 12 and the pulses from the pulse former 6 can reach the distance counter 13.

The signal received is also forwarded to the phase-meter 11 and to the pulse shaper 12. When a marking is received the gate circuit 10 is blocked again and the distance counter 13 now indicates the coarse value G. The precision value F is gained from the phase-meter 11. After reading the counter 13 and the phase-meter 11, which can be performed automatically, the counter is restored with the gate circuit 10 closed.

The oscillation received again at the transmitting station can be either distorted or bear too much noise. Therefore the stopping pulse for the counter 31 can fluctuate in time. The zero passages of the measuring frequency also fluctuate, but this is not important, because due to the large number of wave trains a certain matching is obtained. When in the immediate vicinity of the transition from one coarse range to the next one the counter is stopped either too early or too late, due to a noise-interfered marking a value is obtained which is either too low or too high by one coarse value. It would also be possible to provide an average reading for the coarse measuring. Due to the considerably lower number of markings this average matching would be less effective, and would require correspondingly more time. Since, moreover, the coarse measuring is evaluated digitally the forming of an average value would be rather expensive. In order to correct faults near the transition from one coarse range to the other a circuit arrangement as shown in FIG. 3 is provided.

In this circuit arrangement, partly represented as a functional block diagram, logical circuits are used. To simplify the description only the binary terms 0 and 1 are used for the signals. To simplify the representation on the drawing a part of the arrangements, shown individually in FIG. 2, have been concentrated to timing pulse sender 15.

From timing pulse sender 15 the counter 13′ as well as the emission of the signal frequency is controlled. In the processing circuit 16 the signal wave, necessary for phase measuring, is derived and from the received oscillation the oscillation for the precision measuring is derived in the evaluation circuit 17. Precision measuring is performed in the precision measuring device 17. This device mechanically sets a contact disk 18 which has a conductive track on one half of its circumference and two tapping points $a$ and $b$ staggered by 180°, to the precision measuring angle.

FIG. 4 shows the counting pulses which must have a normal crystal stability. Their positive edges advance the time counter. When the stopping pulse, i.e. a received marking is in the center between the transition from adjacent coarse ranges an error is impossible. But near the transitions such an error may occur. The width of the critical range depends on kind and magnitude of the interference. In FIG. 4, $a$ a critical range of ±90° was selected, said range being hatched. Actually this range does not need be so wide. Its narrowing is easily possible. It can now clearly be understood that the indicated value is correct when the stopping pulse falls within the left half of a hatched area and the precision measuring simultaneously results in a value between 270° and 0°. The correct value is indicated, too, when the stopping pulse is within the right half of a hatched area and the precision measuring simultaneously indicates a value of between 0 and 90°. On the other hand the coarse indication is wrong to the extent of at least one unit, if at a precision indication between 0 and 90° the stopping pulse is in the left half of a hatched area respectively, if at a precision indication of 270 to 0° the stopping pulse comes within the right half of such a hatched area. In the first case the correct value is obtained when the counting value is enlarged by one unit, in the second case the value indicated by the counter must be reduced by one unit.

Within the hatched range the gate circuits 19 and 20 are successively actuated in cooperation with the disk 18. The possible periods, when the gate 19 is open, is shown in FIG. 4, $d$, and the period for the gate 20 in FIG. 4, $e$. Said opening periods for both gates are obtained by the cooperation of the timing pulses $a$, $b$, $c$. The respective gate is opened only when the AND-circuit 21 or 22 becomes conductive by applying the signal 1 from the contact disk 18.

For a further explanation of the mode of operation it is assumed now that the switch-off impulse is within the left half of the hatched area and that the contact disk is set to a value between 270° and 0°. In this position the contact disk 18 furnishes at the tapping grid $a$ a signal 0 and applies it to the AND-circuit 21. A signal 1 is correspondingly applied to the AND-circuit 22 via the tapping point $b$. Since it was assumed that the stopping pulse, also representing a signal 1, occurs in the left hatched part it cannot pass through gate 19, because this gate remains locked due to the AND-condition not having been met. The AND-condition for the right half is met for gate 20; gate 20 is open during this period, during which, however, no pulse arrives. At the outputs of both flip-flop circuit 23 and 24 the signal 0 remains and at the output I, connected via an inverted OR-circuit 25, the signal 1 remains. This signal at the output I indicates that the counter position needs not to be changed. (If one of the outputs II and III shows the signal 1 the output I has the signal 0 and thus interrupts the direct through-connection of the counter to the outputs A in FIG. 5.)

The received stopping pulse, moreover, controls the timing pulse sender and a release facility 30 which, after a defined delay, releases through the output IV the counter position with the corresponding correction. Through input 31 the timing pulse sender and a resetting facility Rü is actuated which initiates the necessary processes for the following measuring.

If the coarse measuring pulse would be in the right half of the hatched area and the precision measuring value would be between 270° and 0° the stop pulse would trigger the flip-flop circuit 24 via the opened gate circuit 20. At the output II the potential would then change from 0 to 1. At the same time the signal at point I would be brought to the value 0 via the inverted OR-circuit 01. A signal at the output II indicates that the coarse value is too high by one unit and the counter position must be reduced. At the same time the direct through-connection of the counter position on the outputs A is blocked.

When the precision measuring value is between 0 and 90° a signal 1 is furnished from the contact disk 18 at the tapping $a$ to the AND-circuit 21 and a signal 0 to 22 from the tapping point $b$. When the received coarse pulse now appears at the left hatched part it can pass through the gate circuit gate 19, because the AND-condition for AND-circuit 21 is met. The flip-flop circuit 23 triggers and at the output III the signal 1 is now applied. The signal at the output I now becomes 0 via the inverting OR-circuit 25. If the coarse pulse is in the right portion of the hatched area it cannot pass through gate 20, because the AND-condition is not met for AND-circuit 22. The flip-flop circuit 24 is not influenced and the signal 1 at the output I remains.

In case the received coarse pulse is not within the hatched area the counter value is indicated unmodified, independent from the position of the precision measuring device, because no pulse reaches the flip-flop circuits.

To correct the counter a diode circuit can be used as shown in FIG. 5, for example. The row Z shows the inputs 40 to 46 of the counter. The inputs I to IV represent the outputs of the circuit arrangement described in FIG. 3.

It is now assumed that the signal 1 is applied to the input 43 of the counter. When the counting value is not to be changed the input I also shows a signal 61. When a release pulse arrives via the line IV the AND-circuit 1 becomes conductive and thereupon also the AND-circuit 67. The signal can now be derived at the output 53 of the indicating facility A via the or-circuit 87. If, on the other hand, a signal is applied to the input II the AND-circuit 63 becomes conductive and causes, together with the signal at the input 43, the AND-circuit 80 to become conductive. The signal is then indicated at the output 52 via the OR-circuit 86. When the signal would be applied to input III the AND-circuit 74 would become conductive and the counting value is indicated via the OR-circuit 88 as the figure 4.

FIG. 6 shows another arrangement in which a binary counter 91 is used which can count forward and backward. This counter is controlled by the timing pulse sender 15. Via both gate circuits 92 and 93, corresponding to the ones shown in FIG. 3, the counter is now either advanced or set back by the unit 1. The counting result is converted in a code converter 94 from binary to decimal and then indicated via a release circuit 95.

All circuit arrangements represent examples only, also the assumed markings. It may be suitable, for example, as protection against faults to provide the markings in a coded form as a defined sequence of wave black-outs.

While I have described above the principles of my invention in connection with specific apparatus, it is to be clearly understood that this description is made only by way of example and not as a limitation to the scope of my invention as set forth in the objects and in the accompanying claims.

I claim:

1. A system for precise distance measuring comprising means to generate sine wave signals, means to transmit said signals, means to receive said signals reflected from an object, means to generate marking indices to gate said sine wave signals at the beginning of said transmission and the reception of said reflected signals, means to measure the phase difference between said transmitted signals and said reflected signals to determine a fine distance measurement and means to count the cycles of said signals during said gate to determine the coarse distance measurement, the sum of said fine and coarse measurement constituting a precise measurement of the distance between said transmitter and said object.

2. A system according to claim 1 wherein said marking indices generating means include a pulse former coupled to said sine wave generating means, a counter, means coupling said counter to said pulse former, a marking circuit coupling said sine wave generating means to said transmitter and means coupling said counter to said marking circuit.

3. A system according to claim 2 further comprising a gate circuit, a pulse shaper, a phase meter and a distance counter, means coupling said transmitted signal and said received signal to said pulse shaper; means coupling the output of said pulse shaper and the output of said pulse former to said gate circuit, means coupling the output of said gate circuit to said distance counter to start the counter and stop the counter respectively to produce a coarse measurement of distance and means coupling the transmitted signal and the received signal to said phase meter to produce a fine measurement of distance.

4. A system for precise distance measuring according to claim 1 further comprising first and second gate circuits which become successively conductive in the transition range from one coarse area to the next coarse area and means controlled by the fine distance measurement means to correct the counting position of the coarse value.

5. A system for precise distance measuring according to claim 4 wherein said fine measuring means comprise a contact disk rotatably controlled by signals derived from the transmitted and received signals, and said disc comprises a conductive zone and a non-conductive zone and first and second tapping points 180° apart, and means to derive from said contact disk first and second voltages to correct the counting position of the coarse value.

No references cited.

CHESTER L. JUSTUS, *Primary Examiner.*

J. P. MORRIS, *Assistant Examiner.*